US012686459B1

(12) United States Patent
Mori

(10) Patent No.: US 12,686,459 B1
(45) Date of Patent: Jul. 21, 2026

(54) VEHICLE

(71) Applicant: Striemo Inc., Tokyo (JP)

(72) Inventor: Yotaro Mori, Tokyo (JP)

(73) Assignee: Striemo Inc., Tokyo (JP)

( * ) Notice: Subject to any disclaimer, the term of this patent is extended or adjusted under 35 U.S.C. 154(b) by 61 days.

(21) Appl. No.: 18/703,150

(22) PCT Filed: Oct. 28, 2021

(86) PCT No.: PCT/JP2021/039774
§ 371 (c)(1),
(2) Date: Apr. 19, 2024

(87) PCT Pub. No.: WO2023/073855
PCT Pub. Date: May 4, 2023

(51) Int. Cl.
B62K 5/10 (2013.01)
B62J 45/412 (2020.01)
B62J 45/415 (2020.01)
(52) U.S. Cl.
CPC ............... B62K 5/10 (2013.01); B62J 45/415
(2020.02); *B62J 45/412* (2020.02); *B62K*
*2204/00* (2013.01)
(58) Field of Classification Search
CPC ...... B62K 5/10; B62K 2204/00; B62J 45/415;
B62J 45/412
See application file for complete search history.

(56) References Cited

U.S. PATENT DOCUMENTS 5,253,172 A * 10/1993 Ito ........................... B60T 8/172
701/41
2010/0168966 A1* 7/2010 Tsujii ....................... B60Q 1/12
280/270

(Continued)

FOREIGN PATENT DOCUMENTS

JP 2005323431 A 11/2005
JP 2016165986 A 9/2016

(Continued)

OTHER PUBLICATIONS

International Search Report; Application PCT/JP2021/039774; Dec. 28, 2021.

(Continued)

*Primary Examiner* — Lindsay M Low
*Assistant Examiner* — Susan E Scharpf
(74) *Attorney, Agent, or Firm* — Duft & Bornsen, PC

(57) ABSTRACT

A vehicle including a steering part disposed above a front wheel, a connecting part connecting a first member supporting the front wheel with a second member supporting a rear wheel in a swingable manner in a left-right direction, an input part inputting a travel command including an acceleration command, a microprocessor configured to perform controlling a traveling actuator, a steering angle detection part detecting a steering angle in the left-right direction of the steering part, and a swing angle detection part detecting a swing angle in the left-right direction of the first member. The microprocessor is configured to perform the controlling including controlling the traveling actuator in accordance with the steering angle and the swing angle so as to generate a driving force smaller than a driving force in accordance with the acceleration command.

13 Claims, 7 Drawing Sheets

(56) References Cited

U.S. PATENT DOCUMENTS

| | | | |
|---|---|---|---|
| 2017/0291637 A1* | 10/2017 | Horiguchi ................ | B62K 5/10 |
| 2019/0322271 A1* | 10/2019 | Ishino ................... | B60W 10/20 |
| 2023/0202611 A1* | 6/2023 | Mori ........................ | B62K 5/02 |
| | | | 180/216 |

FOREIGN PATENT DOCUMENTS

| | | | | |
|---|---|---|---|---|
| JP | 2019188955 A | 10/2019 | | |
| JP | 2020104640 A | 7/2020 | | |
| JP | 6915179 B1 | 8/2021 | | |
| JP | 006935610 B | 9/2021 | | |
| WO | WO-2020117044 A1 * | 6/2020 | ............. | B62K 21/02 |

OTHER PUBLICATIONS

European Search Report; Application 21962403.8;10 pages; Jul. 21, 2025.

* cited by examiner

RIGHT ◄————————————► LEFT

VEHICLE

CROSS-REFERENCE TO RELATED APPLICATION

This application is a National Stage of PCT international application Ser. No. PCT/JP2021/039774 filed on Oct. 28, 2021 which designates the United States, incorporated herein by reference.

TECHNICAL FIELD

This invention relates to a vehicle including a front wheel and a rear wheel.

BACKGROUND ART

As this type of vehicle, conventionally, there is a known vehicle configured to be swingable in a left-right direction through a swing mechanism (for example, see Patent Literature 1). The vehicle described in Patent Literature 1 is further configured so that a front wheel is steerable in the left-right direction by an operation of a handlebar.

CITATION LIST

Patent Literature

Patent Literature 1: Japanese Examined Patent Publication No. 6935610

DISCLOSURE OF INVENTION

Problems to be Solved by the Invention

However, an attitude of the vehicle may become unstable when acceleration and deceleration operations are performed in a steered state and in an inappropriate attitude.

Means for Solving Problem

An aspect of the present invention is a vehicle including: a front wheel and a rear wheel; a steering part disposed above the front wheel; a placement part on which feet of the occupant are placed; a first member configured to support the front wheel to be rotatable and steerable by the steering part; a second member disposed behind the first member to support the rear wheel to be rotatable; a connecting part configured to connect the first member with the second member so that the first member is swingable in a left-right direction about an axial line extending in a front-rear direction; a traveling actuator configured to drive at least one of the front wheel and the rear wheel; an input part configured to input a travel command including an acceleration command; a control unit configured to control the traveling actuator so as to generate a driving force in accordance with the travel command input by the input part; a steering angle detection part configured to detect a steering angle in the left-right direction of the steering part; and a swing angle detection part configured to detect a swing angle in the left-right direction of the first member relative to the second member. The control unit controls the traveling actuator in accordance with the steering angle detected by the steering angle detection part and the swing angle detected by the swing angle detection part so as to generate a driving force smaller than the driving force in accordance with the acceleration command input by the input part.

Effect of the Invention

According to the present invention, an effect of inappropriate operation can be suppressed in a state where a vehicle is steered and a stability of a vehicle can be improved.

DESCRIPTION OF EMBODIMENT

Hereinafter, an embodiment of the present invention will be described with reference to FIGS. 1 to 8. A vehicle according to the embodiment of the present invention is a three-wheeled vehicle including a single front wheel and a pair of left and right rear wheels, and is formed such that a user can ride in a standing posture.

Figure 1:
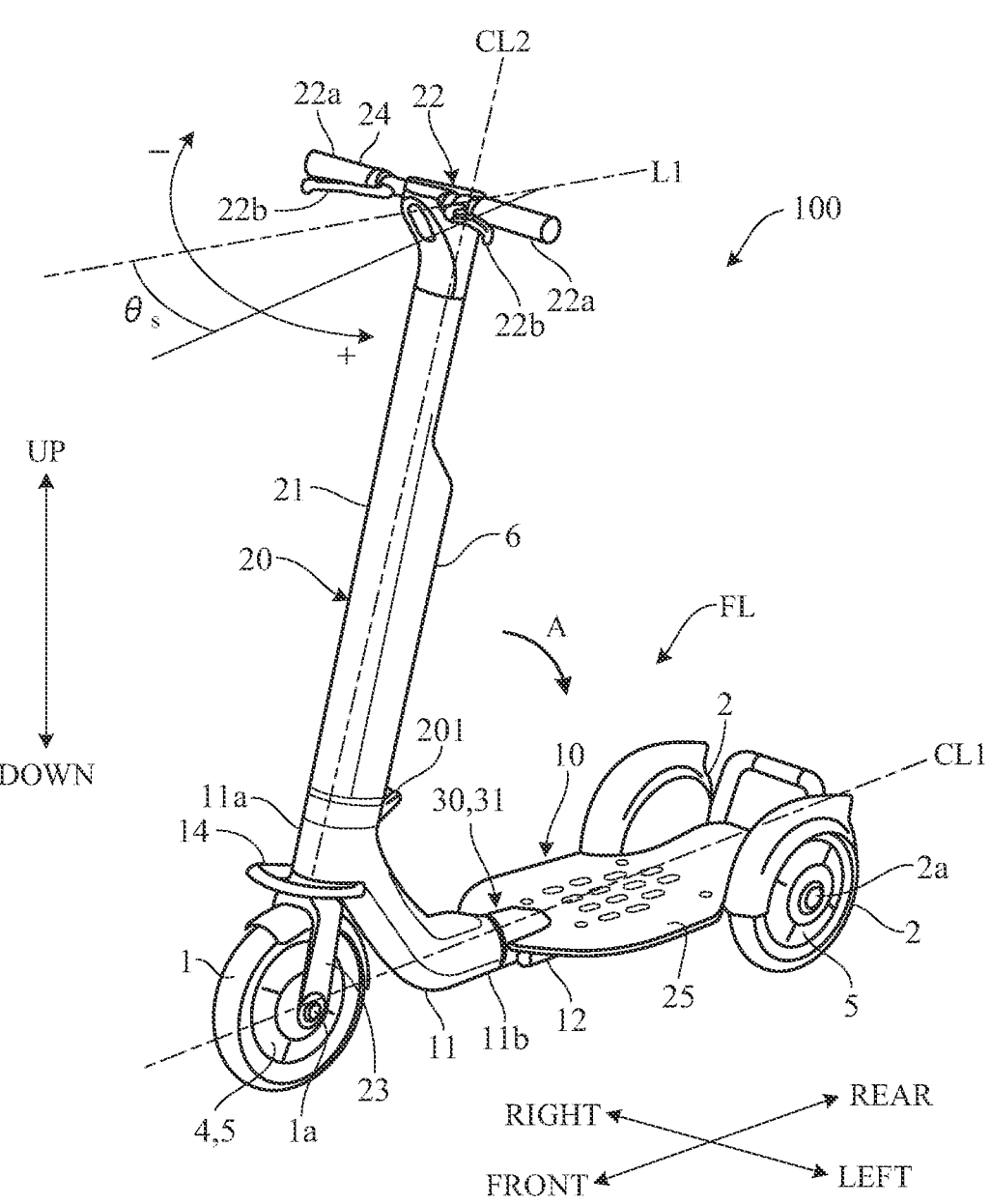
FIG. 1 is a perspective view illustrating an overall configuration of a vehicle according to an embodiment of the present invention and a view of the vehicle from a left front diagonal direction.
Figure 2:
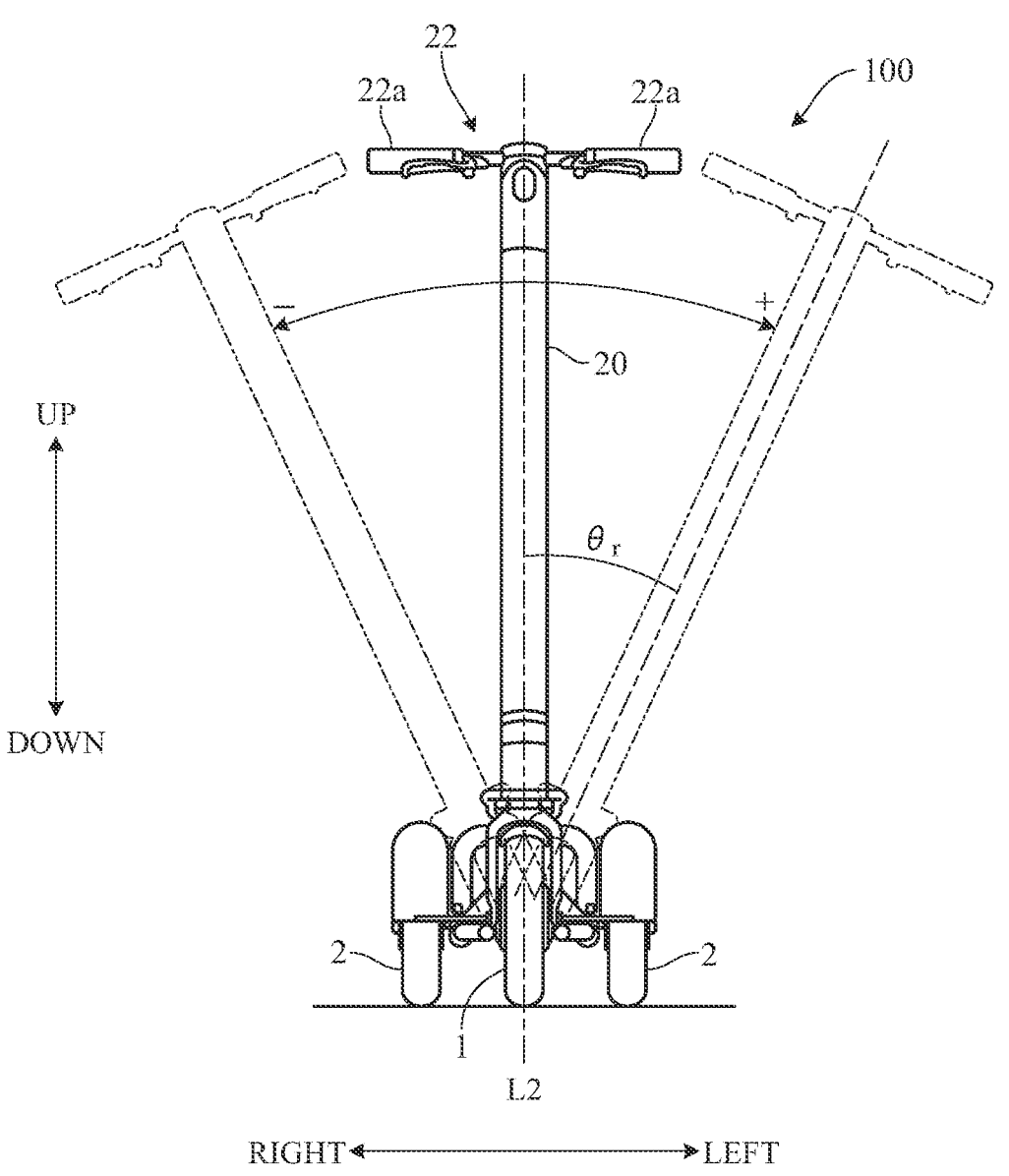
FIG. 2 is a front view illustrating the overall configuration of the vehicle according to the embodiment of the present invention.

FIG. 1 is a perspective view illustrating an overall configuration of a vehicle 100 according to the embodiment of the present invention, and FIG. 2 is a front view. Hereinafter, three axial directions orthogonal to each other as illustrated are defined as the front-rear direction (length direction), the left-right direction (width direction), and the up-down direction (height direction) of the vehicle 100, and a configuration of each part will be described according to this definition. FIG. 1 is a view of the vehicle 100 viewed from a left obliquely front side, and FIG. 2 is a view of the vehicle 100 viewed from a front side.

As illustrated in FIGS. 1 and 2, the vehicle 100 includes a front wheel 1 and rear wheels 2, and a frame FL included in a skeleton of the vehicle 100, and is entirely symmetric with respect to a center line CL1 passing through the center of the vehicle 100 in the left-right direction. More specifi-
cally, the front wheel 1 is arranged along the center line CL1,
and the left and right rear wheels 2 are arranged at sym-
metrical positions across the center line CL1. The front
wheel 1 has the same diameter as the rear wheels 2. The
front wheel 1 may have a larger diameter or a smaller
diameter than the rear wheels 2. The center line CL1 is a
swing center of a connecting part 30, which will be
described later, and extends at a downward slope toward a
rear side. The center line CL1 may extend horizontally
toward the rear side, or may extend at an upward slope
toward the rear side. The frame FL includes a main frame 10
extending from the front wheel 1 to the rear wheel 2, and a
vertical frame 20 erected above the front wheel 1.

The main frame 10 includes a front frame 11 extending
rearward from above the front wheel 1, and a rear frame 12
connected to the front frame 11 and extending toward the
rear wheel 2. The front frame 11 is configured to be inclined
at an upward slope (forward ascending) toward a front side.
The front end portion 11a of the front frame 11 is located
above the front wheel 1, and the rear end portion 11b extends
substantially horizontally.

The vertical frame 20 has a substantially columnar or
cylindrical shaft 21 extending along an axial line CL2
inclined rearward by a predetermined angle relative to the
gravitational direction such that the upper end portion is
located rearward of the lower end portion. The shaft 21
passes through the front end portion 11a of the front frame
11 and is rotatably supported by the front frame 11 about the
axial line CL2. A handlebar 22 is provided at an upper end
portion of the shaft 21, and a pair of left and right front forks
23 are fixed to a lower end portion thereof. The vertical
frame 20 may include a vertical pipe extending upward from
the front end portion 11a of the front frame 11 and a shaft
passing through the inside of the vertical pipe. In this case,
the vertical pipe may be integrally provided in the front
frame 11, and the shaft may be rotatably provided in the
vertical pipe about the axial line CL2.

A rotation shaft 1a of the front wheel 1 is rotatably
supported by the pair of left and right front forks 23. The
front wheel 1 is steered by a turning operation (steering) of
the handlebar 22 about the axial line CL2. The handlebar 22
is a bar handle that extends substantially linearly in the
left-right direction. A plastic or rubber grips 22a gripped by
the user are provided at both left and right ends of the
handlebar 22. Brake levers 22b are provided in front of the
grips 22a.

Although not illustrated in detail, a traveling motor 4
(in-wheel motor) and a brake unit 5 are housed inside the
front wheel 1. For example, the traveling motor 4 is arranged
on the left side, and the brake unit 5 is arranged on the right
side. The vehicle 100 is formed as an electric vehicle that
travels by driving of the traveling motor 4. The handlebar 22
is provided with a throttle lever 24 at or near the grip 22a.
The throttle lever 24 is configured to be operable by an
occupant while gripping the grip 22a, and a travel command
including an acceleration command of the vehicle 100 is
inputted by operating the throttle lever 24. The throttle lever
24 is provided so as to be capable of adjusting an operation
amount, and a command value is input so as to increase the
driving force of the traveling motor 4 as the operation
amount of the throttle lever 24 increases.

The brake unit 5 is formed as, for example, a drum brake
unit included in a drum brake. The rear wheels 2 are
similarly provided with the brake units. These brake units 5
are operated by an operation of the brake levers 22b, and a
braking force is applied to the front wheel 1 and the rear wheels 2. The traveling motor 4 as an electric motor may be
provided in the rear wheels 2 instead of the front wheel 1,
or in both the front wheel 1 and the rear wheels 2. When the
traveling motors are provided in both the front wheel 1 and
the rear wheels 2, the towing ability and the climbing ability
of the vehicle 100 can be improved.

A longitudinally elongated battery 6 is supported on the
rear surface of the vertical frame 20 via a holder. The battery
6 is a secondary battery such as a lithium ion battery in
which electric power supplied to the traveling motor 4 is
stored. The battery 6 is connected to the traveling motor 4
via a power line passing through the vertical frame 20.
Electric power supplied from the battery 6 to the traveling
motor 4 is controlled by a power control unit not illustrated.
The battery 6 may be disposed inside the vertical frame 20,
or may be disposed around other structural members such as
the main frame 10.

Although not illustrated, the handlebar 22 is provided
with a starter switch to instruct on/off of a main power
supply, a blinker switch to notify of right/left turning, an
accelerator lever to input a traveling command, and the like
so as to be operable by the user. A display unit that displays
vehicle information such as a remaining battery capacity and
a set vehicle speed can also be provided. Further, although
not illustrated, below the handlebar 22, a pair of left and
right blinker lamps that blink in response to an operation of
the blinker switch is provided, and a headlight is provided at
the upper end portion of the vertical frame 20.

The rear frame 12 extends rearward through the inside of
the left and right rear wheels 2. Although not illustrated, a
support frame (for example, a pair of front and rear support
frames) extending in the left-right direction is joined to both
left and right sides of the rear frame 12 in front of the rear
wheel 2. A rear wheel support portion extending in the
left-right direction is joined to a rear portion (for example,
a rear end portion) of the rear frame 12, and the rotation shaft
2a of the rear wheel 2 is rotatably supported by the rear
wheel support portion.

On the upper surfaces of the pair of front and rear support
frames, a step (footrest) 25, which is a plate member having
a substantially rectangular shape in a plan view and extend-
ing in the front-rear direction from the rear frame 12 to the
inner side of the left and right rear wheels 2 and in the
left-right direction within the range of the length between
the left and right rear wheels 2, is mounted. The step 25 is
fixed to the support frame by welding or the like, whereby
both ends of the step 25 in the front-rear direction are
supported from the rear frame 12 via the support frames. The
step 25 functions as a placement part on which both feet of
the user (occupant) in a standing posture are placed, and the
upper surface (placement surface) of the step 25 is config-
ured as a horizontal surface parallel to the road surface 101.
The length in the front-rear direction and the width in the
left-right direction of the step 25 are defined so that a
predetermined portion of the user's foot, for example, from
the heel to the ball of the foot, can be placed.

The front frame 11 and the rear frame 12 of the main
frame 10 are connected to each other via the connecting part
30. That is, the front frame 11 is connected to the rear frame
12 via the connecting part 30 so as to be swingable in the
left-right direction around the center line CL1 extending in
the front-rear direction. The connecting part 30 has a Nei-
dhart rubber spring 31 fixed to the bottom surface of the flat
plate portion of the front frame 11.

Figure 3:
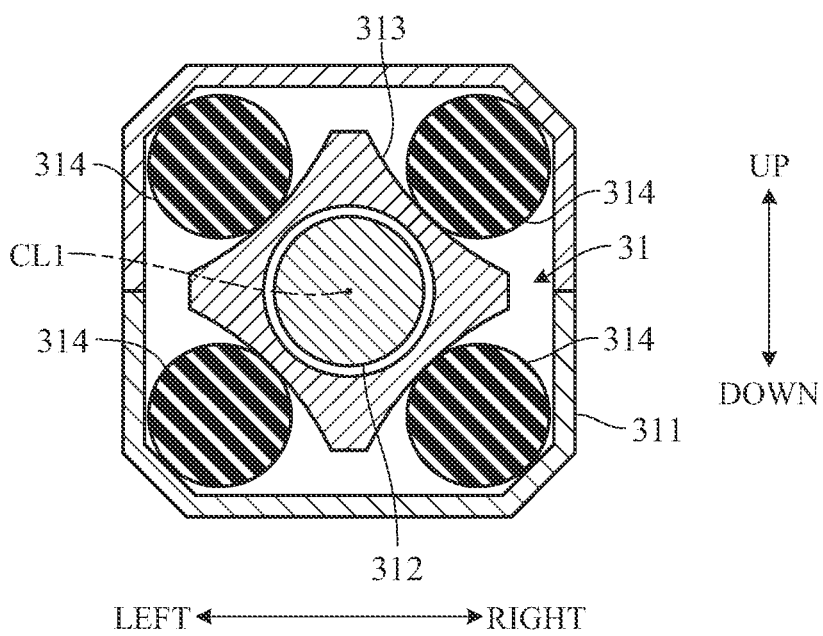
FIG. 3 is a cross-sectional view illustrating a schematic configuration of a Neidhart rubber spring provided in a connecting part of the vehicle according to the embodiment of the present invention.

FIG. 3 is a cross-sectional view illustrating a schematic
configuration of the Neidhart rubber spring 31 provided in
the connecting part 30. As illustrated in FIG. 3, the Neidhart rubber spring 31 is incorporated in a case 311 having a substantially rectangular frame shape in a cross section and fixed to the rear end portion 11b of the front frame 11. In the case 311, a shaft 312 having a substantially circular cross section, which is fixed to the front end portion of the rear frame 12 and extends in the front-rear direction along the center line CL1, is disposed. The front end portion of the rear frame 12 may be configured to have a substantially circular cross section, and may be used as the shaft 312. The Neidhart rubber spring 31 includes a substantially diamond-shaped cam block 313 spline-connected to the shaft 312 so as to be rotatable integrally with the shaft 312, and a rubber roller 314 disposed opposite to each surface formed in a concave shape of the cam block 313.

FIG. 3 shows an initial state in which the front frame 11 is not swung, and at this time, the vertical frame 20 is not inclined in the left-right direction as shown by the solid line in FIG. 2, and the vehicle 100 is in the reference posture. When torque acts on the case 311 in this initial state and the case 311 rotates about the center line CL1, the rubber roller 314 is pressed between the case 311 and the cam block 313 to elastically deform, and the rubber roller 314 becomes an ellipse. At this time, the front frame 11 swings together with the vertical frame 20, and the vehicle 100 is in an inclined posture as shown by a dashed double-dotted line in FIG. 2. In this case, as the rotation angle of the case 311 increases, the rotation resistance to the case 311 increases. When the torque acting on the case 311 becomes zero, the rubber roller 314 returns to its original shape by the elastic force, and the front frame 11 returns to the reference posture.

As described above, by providing the front frame 11 of the main frame 10 so as to be swingable via the connecting part 30, the user riding on the vehicle 100 in a standing posture can easily turn the vehicle 100 in the left-right direction. For example, when turning the vehicle 100 in the left-right direction, the user slightly bends the knees and the ankles and inclines the upper body to the left or right. As a result, the vertical frame 20 can be swung together with the front frame 11 in a stable posture with both feet placed on the step 25 while the step 25 integrated with the rear frame 12 is kept horizontal, and the front wheel 1 can be inclined to the left and right. As a result, the vehicle 100 can be smoothly turned, and the turning performance is improved.

In addition, since the Neidhart rubber spring 31 is provided in the connecting part 30, when the front frame 11 is swung to the left and right from the reference posture, a restoring force acts on the front frame 11, and swinging of the front frame 11 can be favorably suppressed. The cam block 313 may be formed not in a quadrangular shape but in another polygonal shape (for example, a triangular shape). Instead of forming all surfaces of the cam block 313 in a concave shape, for example, two surfaces may be formed in a concave shape, and the rubber rollers 514 may be disposed to face these concave surfaces. As an example, it may be disposed to face two surfaces formed in a triangular cam block. The restoring force may be acted on the front frame 11 by using an elastic member such as a coil spring instead of the Neidhart rubber spring 31. That is, the configuration of a restoring force applying part is not limited to the Neidhart rubber spring 31.

Although not illustrated, a load point (a center point of a load acting from a sole of the foot) acting on the step 25 due to the weight of the user in the standing posture is located in a triangular region connecting the ground point of the front wheel 1 and the respective ground points of the pair of left and right rear wheels 2 in a plan view. As a result, the user can ride on the vehicle 100 in a stable posture both while traveling and while stopping.

The vertical frame 20 is provided so as to be rotatable rearward (the direction of an arrow "A" in FIG. 1) via a rotation mechanism 201 above the front end portion 11a of the front frame 11. Accordingly, the vehicle 100 can be brought into a folded posture from the traveling posture of FIG. 1. In the folded posture, the vertical frame 20 is disposed between the left and right rear wheels 2 substantially parallel to the rear frame 12. The vehicle 100 can be easily transported by raising the vehicle 100 in the folded posture with the rear wheels 2 as a fulcrum and rolling the rear wheels 2 with the front wheel 1 disposed on the upper side. At a front end portion of the front frame 11, a handle 14 gripped during transportation of the vehicle 100 is provided.

In the present embodiment, by the way, the handlebar 22 is provided to be steerable in the left-right direction with the axial line CL2 as the center, and the vertical frame 20 is provided to be swingable in the left-right direction with the center line CL1 as the center. Therefore, when the vehicle 100 starts moving or makes a turn, in a state in which the relationship between a steering angle and a swing angle is not appropriate, if the throttle lever 24 is operated (a throttle operation), the stability of the vehicle 100 may be degraded. Specifically, if the throttle is operated in a state in which the handlebar 22 is steered to the left and the vertical frame 20 is swung to the right, a change in the centrifugal force of the vehicle 100 will increase, and the stability of the vehicle 100 may be degraded. For this reason, in order to suppress the stability of the vehicle 100 from being degraded in a state in which the relationship between the steering angle and the swing angle is not appropriate, the present embodiment is configured as follows.

Hereinafter, as illustrated in FIG. 1, an operation amount of the handlebar 22 from the axial line L1, which extends in the front-rear direction, is defined as a steering angle $\theta$s. In addition, the steering angle $\theta$s at the time when the handlebar 22 is operated to the left is defined as a positive steering angle, and the steering angle $\theta$s at the time when the handlebar is operated to the right is defined as a negative steering angle. Further, as illustrated in FIG. 2, a swing amount of the vertical frame 20 from the axial line L2, which extends in the up-down direction, is defined as a swing angle $\theta$r. In addition, the swing angle $\theta$r at the time when the vertical frame 20 is swung to the left is defined as a positive swing angle, and the swing angle $\theta$r at the time when the vertical frame 20 is swung to the right is defined as a negative swing angle.

Figure 4:
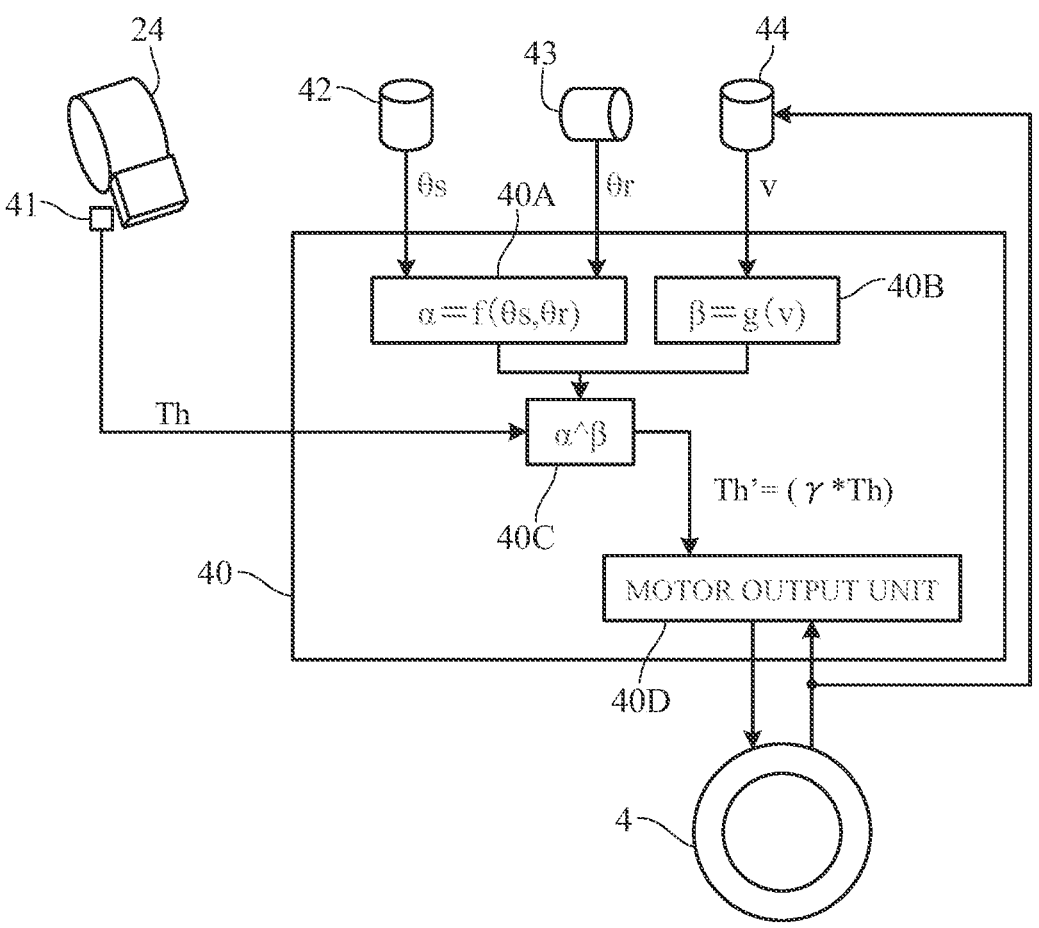
FIG. 4 is a block diagram illustrating a control configuration of a traveling drive system of the vehicle according to the embodiment of the present invention.

FIG. 4 is a block diagram schematically illustrating a configuration of a controller 40 provided in a power control unit that controls driving of the traveling motor 4. The controller 40 includes a computer including a processing unit such as a CPU, a storage unit such as a ROM or a RAM, and other peripheral circuits. As illustrated in FIG. 4, signals from a throttle sensor 41, a steering angle sensor 42, a swing angle sensor 43, and a vehicle speed sensor 44 are input to the controller 40.

The throttle sensor 41 is provided in the throttle lever 24, and detects a command value (a throttle command value Th) corresponding to an operation amount on the throttle lever 24. The steering angle sensor 42 is provided on the shaft 21, for example, and detects a rotation amount of the shaft 21 by the operation on the handlebar 22, that is, the steering angle $\theta$s. The swing angle sensor 43 is provided in the connecting part 30, and detects the swing angle $\theta$r. The vehicle speed sensor 44 is provided on the rotation shaft 1*a* of the front wheel 1 or the traveling motor 4, and detects a vehicle speed v from the rotation speed of the rotation shaft 1*a* or the traveling motor 4.

The controller 40 performs predetermined processing in accordance with input signals from these sensors 41 to 44, and controls driving of the traveling motor 4. The traveling motor 4 is, for example, an embedded magnet synchronous motor including a rotor and a stator arranged around the rotor, and is driven by electric power supplied from the battery 6 to a coil of the stator via the controller 40. A synchronous reluctance motor, a switched reluctance motor, or the like without a magnet can also be used as the traveling motor 4.

The controller 40 calculates a correction coefficient $\alpha$ for correcting a throttle command value Th, based on the steering angle $\theta$s, the swing angle $\theta$r, and the vehicle speed v that have been detected by the sensors 42 to 44. Specifically, a first correction coefficient $\alpha$ is calculated by a processing unit 40A with use of a function f ($\theta$s, $\theta$r) with the steering angle $\theta$s and the swing angle $\theta$r as parameters, and a second correction coefficient $\beta$ is calculated by a processing unit 40B with use of a function g(v) with the vehicle speed v as a parameter. Furthermore, a processing unit 40C calculates a to the power of $\beta$ R as the correction coefficient $\gamma$. Furthermore, the processing unit 40C calculates a corrected throttle command value Th' (referred to as a motor command value) obtained by multiplying the throttle command value Th by the correction coefficient $\gamma$, and outputs such a throttle command value Th' to a motor output unit 40D. The motor output unit 40D controls the traveling motor 4 so that the traveling motor 4 outputs driving torque in accordance with the motor command value Th'.

Figure 5A:
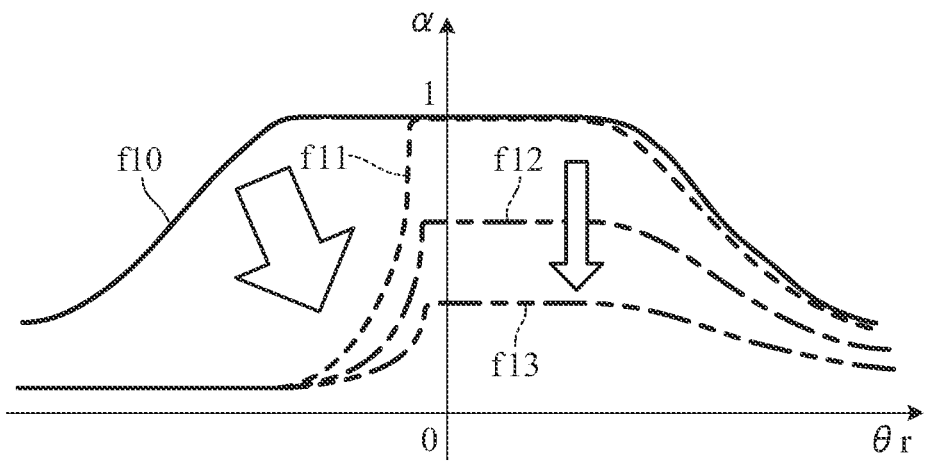
FIG. 5A is a diagram illustrating a relationship between a steering angle, a swing angle and a first correction coefficient when the steering angle is 0 degree or more, which is used to calculate a motor command value in FIG. 4.
Figure 5B:
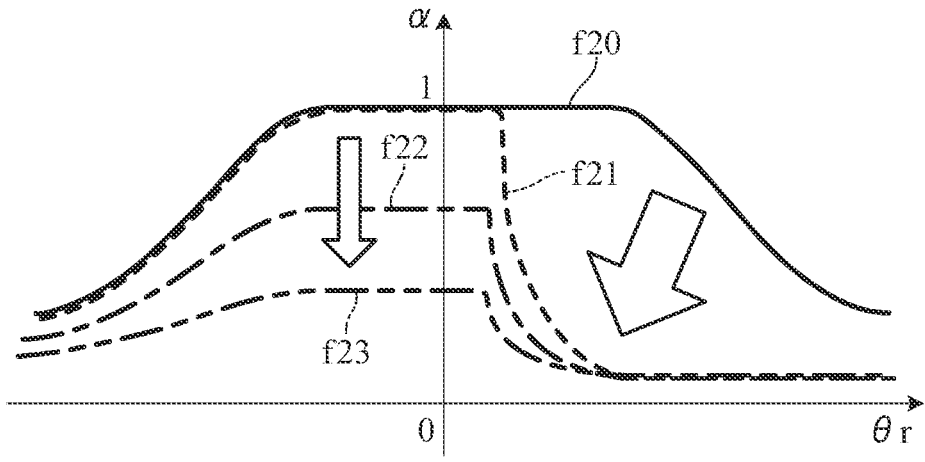
FIG. 5B is a diagram illustrating a relationship between the steering angle, the swing angle and the first correction coefficient when the steering angle is 0 degree or less, which is used to calculate the motor command value in FIG. 4.

FIGS. 5A and 5B are diagrams illustrating an example of characteristics indicating a relationship between the steering angle $\theta$s, the swing angle $\theta$r, and the first correction coefficient $\alpha$. In particular, FIG. 5A illustrates a characteristic when the steering angle $\theta$s is equal to or larger than 0 degrees (when the vehicle is steered to the left), and FIG. 5B illustrates a characteristic when the steering angle $\theta$s is equal to or smaller than 0 degrees (when the vehicle is steered to the right). Specifically, characteristics f10 (a solid line), f11 (a dotted line), f12 (a dashed-dotted line), and f13 (a dashed double-dotted line) in FIG. 5A respectively indicate relationships between the swing angle $\theta$r and $\alpha$, in cases where the steering angles $\theta$s are 0 degrees, 10 degrees, 20 degrees, and 30 degrees, and characteristics f20 (a solid line), f21 (a dotted line), f22 (a dashed-dotted line), and f23 (a dashed double-dotted line) in FIG. 5B respectively indicate relationships between the swing angle $\theta$r and $\alpha$, in cases where the steering angles $\theta$s are 0 degrees, –10 degrees, –20 degrees, and –30 degrees. These characteristics are stored beforehand in a memory.

The first correction coefficient $\alpha$ is calculated in a range that is larger than 0 and equal to or smaller than 1, and the correction coefficient $\gamma$ and the motor command value Th' increase, as the first correction coefficient $\alpha$ increases. As illustrated in FIGS. 5A and 5B, in a case where the steering angle $\theta$s is 0 degrees (the characteristics f10 and f20), a is equal to 1 or approximately 1 in a region where the swing angle $\theta$r is small, and a gradually decreases, as the magnitude (an absolute value) of the swing angle $\theta$r increases. Therefore, in a case where the magnitude of the swing angle $\theta$r becomes equal to or larger than a predetermined value, the motor command value Th' decreases, and the motor output is suppressed.

In a case where signs of the steering angle $\theta$s and the swing angle $\theta$r are identical to each other, that is, in a case where the swing angle $\theta$r is positive in FIG. 5A and in a case where the swing angle $\theta$r is negative in FIG. 5B, $\alpha$ is substantially constant in a region where the swing angle $\theta$r is small in each of the characteristics f11 to f13 and f21 to f23 in a similar manner to the characteristics f10 and f20, and a gradually decreases as the magnitude of the swing angle $\theta$r increases. However, when compared at the identical swing angle $\theta$r, a decreases, as the steering angle $\theta$s increases. In other words, a decrease rate of a increases, as the steering angle $\theta$s increases. As a result, the correction coefficient $\gamma$ and the motor command value Th' decrease, as the magnitude of the steering angle $\theta$s increases, and the motor output is suppressed.

On the other hand, in a case where the signs of the steering angle $\theta$s and the swing angle $\theta$r are different from each other, that is, in a case where the swing angle $\theta$r is negative in FIG. 5A, and in a case where the swing angle $\theta$r is positive in FIG. 5B, as the magnitude of the swing angle $\theta$r increases in each of the characteristics f11 to f13 and f21 to f23, there is almost no constant section of a and a rapidly decreases along, for example, a curve approximated by a downward convex parabola or an inversely proportional graph. Such a decrease rate is larger than a decrease rate obtained in the case where the signs of the steering angle $\theta$s and the swing angle $\theta$r are identical to each other. When compared at the identical swing angle $\theta$r, a decreases, as the steering angle $\theta$s increases. In this manner, in the case where the signs of the steering angle $\theta$s and the swing angle $\theta$r are different from each other, a rapidly decreases, as the magnitude of the swing angle $\theta$r increases. Therefore, the motor output is largely suppressed, as compared with the case where the signs of the steering angle $\theta$s and the swing angle $\theta$r are identical to each other.

Figure 6:
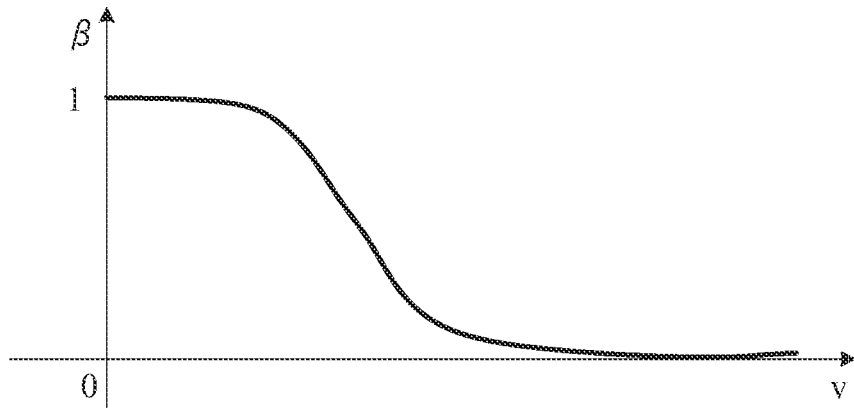
FIG. 6 is a diagram illustrating a relationship between a vehicle speed and a second correction coefficient, which is used to calculate the motor command value in FIG. 4.

FIG. 6 is a diagram illustrating an example of a characteristic indicating a relationship between the vehicle speed v and the second correction coefficient $\beta$. Such a characteristic is stored beforehand in the memory. The second correction coefficient $\beta$ is set in a range that is equal to or larger than 0 and equal to or smaller than 1. As illustrated in FIG. 6, the second correction coefficient $\beta$ is 1 or approximately 1 in a region where the vehicle speed v is low, and gradually decreases, as the vehicle speed v increases. More specifically, $\beta$ is substantially constant in a region where the vehicle speed v is low, and when the vehicle speed v is equal to or higher than a predetermined value, $\beta$ rapidly decreases, as the vehicle speed v increases.

Figure 7:
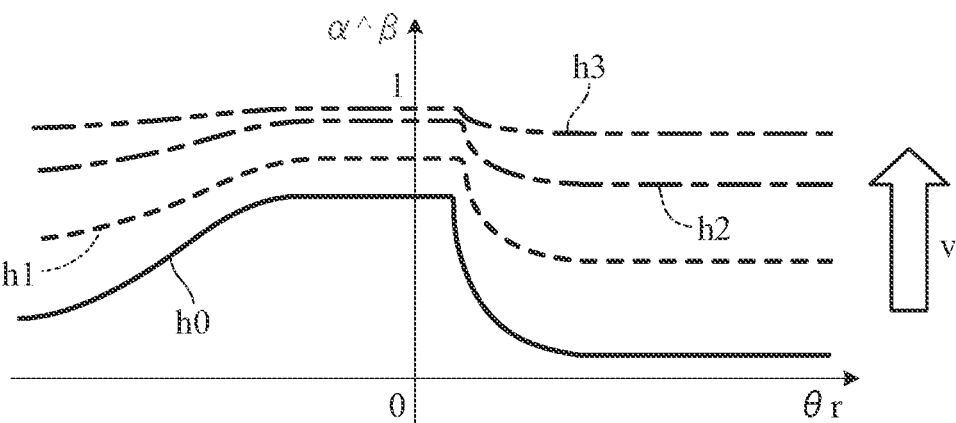
FIG. 7 is a diagram illustrating an example of a change in a correction coefficient with an increase of the vehicle speed, which is used to calculate the motor command value in FIG. 4.

FIG. 7 is a diagram illustrating an example of characteristics indicating a relationship between the swing angle $\theta$r, the vehicle speed v, and the correction coefficient $\gamma$(=$\alpha^{\beta}$), in a case where the steering angle $\theta$s is a predetermined angle (for example, –30 degrees). Characteristics h0 (a solid line), h1 (a dotted line), h2 (a dashed-dotted line), and h3 (a dashed double-dotted line) in FIG. 7 respectively indicate relationships between the swing angle and $\gamma$, in a case where the vehicle speeds are 0 km/h, 10 km/h, 20 km/h, and 25 km/h. Such characteristics are obtained from the characteristics of the first correction coefficient $\alpha$ (FIGS. 5A and 5B) and the characteristics of the second correction coefficient $\beta$ (FIG. 6). As illustrated in FIG. 7, the correction coefficient $\gamma$ increases, as the vehicle speed v increases. Accordingly, the motor command value Th' increases, as the vehicle speed v increases, and the degree of suppression of the motor output decreases.

As described above, in the present embodiment, in the case where a steering direction of the handlebar 22 and a swing direction of the vertical frame 20 are different from each other, the motor command value Th' obtained at the time of operating the throttle lever 24 is smaller than that of a case where the steering direction and the swing direction are identical to each other, and the motor output is suppressed. For example, in a state in which the handlebar 22 is steered to the left and the vertical frame 20 is swung to the right, when a sudden throttle operation is performed, the motor output is suppressed. This decreases a change in the centrifugal force of the vehicle 100, and it becomes possible to prevent the stability of the vehicle 100 from being degraded.

In addition, the degree of suppression of the motor output decreases, as the vehicle speed v increases. Therefore, the user is able to accelerate the vehicle 100 without feeling a sense of incongruity. That is, when the vehicle speed v increases, the change in the vehicle speed v with respect to the change in the throttle command value Th decreases. Therefore, if the motor output is suppressed, even though the user performs the throttle operation, the vehicle speed is less likely to increase, and the user is likely to feel a sense of incongruity. In this regard, in the present embodiment, as the vehicle speed v increases, a suppression rate of the motor output decreases, thereby suppressing the user from feeling the sense of incongruity. When the vehicle speed v is high, the change in the centrifugal force at the time of operating the throttle lever 24 is small. Therefore, even though the degree of suppression of the motor output decreases, the influence on the stability of the vehicle 100 is small, and does not lead to any problem.

According to the present embodiment, the following operations and effects are achievable.

(1) The vehicle 100 according to the present embodiment includes: the front wheel 1 and the rear wheel 2; the handlebar 22 disposed above the front wheel 1; the step 25 on which a foot of an occupant (a user) is placed; the front frame 11 and the vertical frame 20 that support the front wheel 1 to be rotatable and steerable by the handlebar 22; the rear frame 12 that is disposed on a rear side of the front frame 11 and that supports the rear wheel 2 to be rotatable; the connecting part 30 that connects the front frame 11 and the rear frame 12 so that the front frame 11 and the vertical frame 20 are swingable in the left-right direction relative to the rear frame 12 with the center line CL1, which extends in the front-rear direction, as the center; the traveling motor 4 that drives the front wheel 1; the throttle lever 24 into which a travel command including an acceleration command is input by an operation of the occupant; the controller 40 that controls the traveling motor 4 to generate driving force in accordance with the travel command (the throttle command value Th) input by the throttle lever 24; the steering angle sensor 42 that detects the steering angle θs in the left-right direction of the handlebar 22; and the swing angle sensor 43 that detects the swing angle θr in the left-right direction of the vertical frame 20 (FIGS. 1 and 4). The controller 40 controls the traveling motor 4 in accordance with the steering angle θs detected by the steering angle sensor 42 and the swing angle θr detected by the swing angle sensor 43 so as to generate the driving force decreased to be lower than the driving force corresponding to the throttle command value Th input by the throttle lever 24, (FIG. 4).

With this configuration, in the vehicle 100 in which the vertical frame 20 is provided to be swingable and the front wheel 1 is provided to be steerable, when the throttle lever 24 is suddenly operated at the time of traveling while making a turn or the like, in a state in which the swing direction and the steering direction do not match each other, it is possible to suppress a large change in the centrifugal force in accordance with an increase or decrease in the vehicle speed. As a result, it is possible to suppress an acceleration or deceleration operation that makes the relationship of the vehicle speed with respect to the steering angle and the swing angle inappropriate, and to suppress the attitude of the vehicle 100 from becoming unstable.

(2) In a case where the steering direction of the handlebar 22 and the swing direction of the vertical frame 20 that are respectively obtained from detection values of the steering angle sensor 42 and the swing angle sensor 43 are not identical directions to each other, the controller 40 controls the traveling motor 4 to decrease the driving force with respect to identical acceleration commands, as compared with a case where the steering direction and the swing direction are the identical directions to each other (FIGS. 5A and 5B). Accordingly, for example, in a state in which the handlebar 22 is steered to the left and the vertical frame 20 is swung to the right, when a throttle operation is performed, an increase or decrease in the vehicle speed is suppressed. Therefore, a change in the centrifugal force is small, and it is possible to suppress the attitude of the vehicle 100 from becoming unstable.

(3) The controller 40 increases a decrease ratio of the driving force with respect to the throttle command value Th, as the steering angle θs detected by the steering angle sensor 42 increases (FIGS. 5A and 5B). As the steering angle θs is larger, the vehicle attitude tends to be unstable in accordance with an increase or decrease of the vehicle speed. However, the motor output is largely suppressed, so that the vehicle attitude in a case where the steering angle θs is large can be stabilized.

(4) The vehicle 100 further includes the vehicle speed sensor 44 that detects the vehicle speed v (FIG. 4). The controller 40 further controls the traveling motor 4 in accordance with the vehicle speed v detected by the vehicle speed sensor 44 so as to generate the driving force decreased to be lower than the driving force corresponding to the acceleration command input by the throttle lever 24, that is, so as to suppress the motor output (FIGS. 4 and 6). By controlling the traveling motor 4 in consideration of the vehicle speed v, in addition to the steering angle θs and the swing angle θr, in this manner, it is possible to appropriately prevent the vehicle attitude from becoming unstable, when the throttle lever 24 is suddenly operated.

(5) The controller 40 increases the decrease ratio of the driving force with respect to the acceleration command, as the vehicle speed v detected by the vehicle speed sensor 44 decreases (FIGS. 6 and 7). Accordingly, it is possible to prevent the vehicle attitude from becoming unstable without suppressing the acceleration of the vehicle 100 more than necessary.

In the above embodiment, the controller 40 as a control unit calculates the correction coefficient γ of the throttle command value Th, based on the steering angle θs, the swing angle θr, and the vehicle speed v. However, it may calculates the correction coefficient γ based on the steering angle θs and the swing angle θr without considering the vehicle speed v. In a case where the correction coefficient γ is calculated, based on the steering angle θs, the swing angle θr, and the vehicle speed v, or based on the steering angle θs and the swing angle θr, a swing angle (represented by θrg) in consideration of a gravity direction may be used. Hereinafter, such a case will be described.

Figure 8:
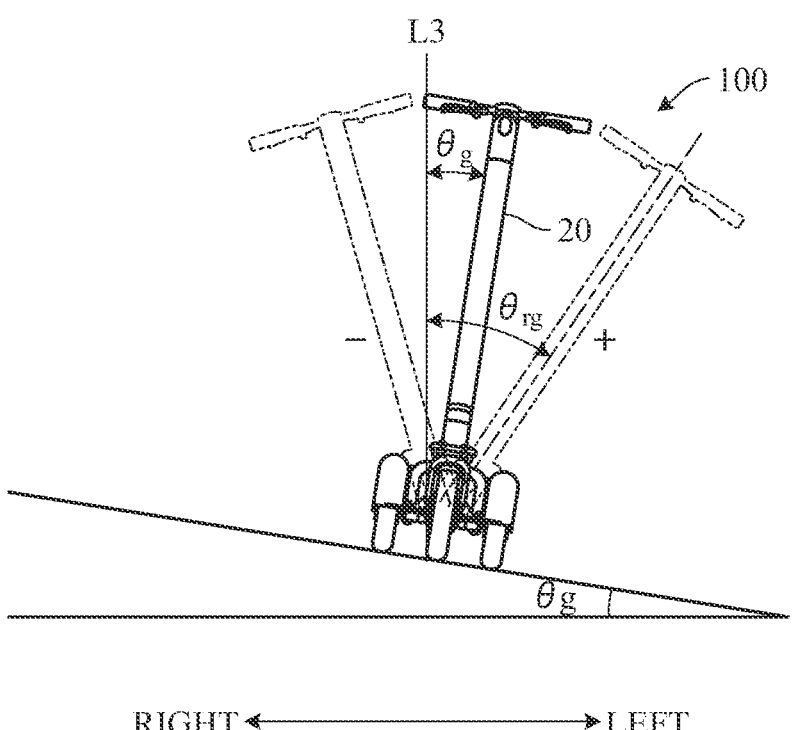
FIG. 8 is a diagram illustrating an example of the swing angle from a reference line in a gravity direction when the vehicle is on the inclined surface.

FIG. 8 is a front view of the vehicle 100, which is located on a sloping ground where θg is an angle (an inclination angle) formed by a road surface with respect to a horizontal line. In FIG. 8, the left-right direction of the vehicle 100 coincides with an inclination direction of the road surface (an inclined surface). In this state, the angle of the vertical frame 20 from a reference line L3, which extends along the gravity direction, is defined as a swing angle $\theta$rg. It is possible to calculate the swing angle $\theta$rg with use of a value of an inclination sensor (not illustrated) that detects the inclination angle $\theta$g of the road surface. That is, it is possible to calculate the swing angle $\theta$rg of the vertical frame 20 with respect to the gravity direction with use of a detection value ($\theta$g) of the inclination sensor and a detection value ($\theta$r) of the swing angle sensor 43. As the inclination sensor, for example, a pendulum type sensor or a float type sensor provided on the rear frame 12 can be used. The swing angle $\theta$rg may be calculated with use of a gyro sensor or a bank angle sensor of gravity type. That is, any configuration may be applicable to a swing angle detection unit that detects the swing angle $\theta$rg from the reference line L3.

By configuring to detect (calculate) the swing angle $\theta$rg from the reference line L3, which extends in the gravity direction in this manner, it is possible to satisfactorily suppress the motor output in accordance with the inclination angle $\theta$g, when the vehicle 100 travels on the road surface inclined in the left-right direction. For example, the magnitude of the swing angle $\theta$rg obtained when the vertical frame 20 is swung on an upward inclination side is smaller than the magnitude of the swing angle $\theta$r obtained while the vehicle is traveling on a non-inclined ground, so that the output of the traveling motor 4 can be prevented from being excessively suppressed.

The above embodiments can be changed in various forms. Hereinafter, modified examples will be described. In the above embodiments, the handlebar 22 serving as a steering part is configured in a bar shape, but the configuration of the steering part is not limited thereto. In the above embodiment, the step 25 (a placement part) is configured by a single plate member, but the placement part may be divided into left and right portions. In the above embodiment, the front wheel 1 is rotatably supported by the front frame 11 and the vertical frame 20 and is operably supported by the handlebar 22, but the configuration of a first member is not limited to that described above. In the above embodiment, the rear wheel 2 is rotatably supported by the rear frame 12, but the configuration of a second member is not limited thereto.

In the above embodiment, the first member (front frame 11) is swingably connected to the second member (rear frame 12) about the center line CL1 (an axial line) through the connecting part 30 provided with the Neidhart rubber spring 31, a biasing part other than the Neidhart rubber spring may be used. Therefore, the configuration of the connecting part is not limited to that described above. In the above embodiment, the traveling motor 4 as a traveling actuator is provided at the front wheel 1, but as long as it is provided so as to drive at least one of the front wheel 1 and the rear wheel 2, the configuration of the traveling actuator is not limited to that described above. Since the brake (brake unit 5) contributes to the traveling operation of the vehicle, the brake is also included in the traveling actuator. Accordingly, the controller 40 may control the brake in addition to the traveling motor 4 or instead of the traveling motor 4. Instead of the traveling motor 4, a prime mover may be used as the traveling actuator.

In the above embodiment, the travel command including the acceleration command is input by the operation of the throttle lever 24 provided on the handlebar 22, but the travel command may be input by the pedal depression operation, and the configuration of an input part is not limited to the above configuration. The travel command may include not only an acceleration command but also a deceleration command. In the above embodiment, the steering angle $\theta$s is detected by the steering angle sensor 42, but the configuration of a steering angle detection part is not limited to the above configuration. In the above embodiment, the swing angle $\theta$r is detected by the swing angle sensor 43, but the configuration of a swing angle detection part is not limited to the above configuration. In the above embodiment, the vehicle speed v is detected by the vehicle speed sensor 44, but the configuration of a vehicle speed detection part is not limited to the above configuration.

In the above embodiment, the first correction coefficient $\alpha$ is calculated based on the characteristics of FIGS. 5A and 5B using the steering angle $\theta$s and the swing angle $\theta$r as parameters, but $\alpha$ may be calculated based on other characteristics. In the above embodiment, the second correction coefficient $\beta$ is calculated based on the characteristic of FIG. 6 using the vehicle speed v as a parameter, but $\beta$ may be calculated based on other characteristic. In the above embodiment, the correction coefficient $\gamma$ of the throttle command value Th is calculated using the first correction coefficient $\alpha$ and the second correction coefficient $\beta$, but the calculation formula of a correction coefficient for calculating the motor command value Th' is not limited to the above one. The correction coefficient $\gamma$ may be calculated without being divided into the first correction coefficient $\alpha$ and the second correction coefficient $\beta$. The correction coefficient $\gamma$ may be calculated using a map or the like without using a calculation formula. Therefore, the configuration of a control unit is not limited to the above configuration.

In the present embodiment, the unstable vehicle attitude is caused by an inappropriate state of the steering angle and the swing angle with respect to the increase and decrease of the vehicle speed. Therefore, in order to enhance the stability of the vehicle attitude, torque may be applied to the shaft portion, which is the rotation center of the steering angle, or the shaft portion, which is the rotation center of the swing angle, or both, by an actuator (not shown) so as to assist in preventing the steering angle and the swing angle from becoming an inappropriate state. That is, for example, when the swing angle is insufficient, the torque may be applied in a direction in which the swing angle increases, while when the steering angle is too large, the torque may be applied in a direction in which the steering angle decreases, thereby assisting the steering. Thus, since the steering angle and the swing angle approach an appropriate state, the output suppression amount for the throttle operation by the above control is reduced.

In the above embodiment, the vehicle 100 is configured to have a single front wheel 1 and a pair of left and right rear wheels 2. However, the vehicle can be configured to have a single front wheel and a single rear wheel, or a pair of front wheels and a single rear wheel. The single front wheel includes, for example, a pair of front wheels included in one position, that is, pair front wheels.

The above explanation is an explanation as an example and the present invention is not limited to the above embodiment or modifications unless sacrificing the characteristics of the invention. The above embodiment can be combined as desired with one or more of the above modifications. The modifications can also be combined with one another.

REFERENCE SIGNS LIST

1 front wheel, 2 rear wheel, 11 front frame, 12 rear frame, 20 vertical frame, 22 handlebar, 24 throttle lever, 25 step, 30 connecting part, 40 controller, 42 steering angle sensor, 43 swing angle sensor, 44 vehicle speed sensor, 100 vehicle.

The invention claimed is:

1. A vehicle, comprising:

a front wheel and a rear wheel;

a steering part disposed above the front wheel;

a placement part on which feet of an occupant are placed;

a first member configured to support the front wheel to be rotatable and steerable by the steering part;

a second member disposed behind the first member to support the rear wheel to be rotatable;

a connecting part configured to connect the first member with the second member so that the first member is swingable in a left-right direction about an axial line extending in a front-rear direction;

a traveling actuator configured to drive at least one of the front wheel and the rear wheel;

an input part configured to input a travel command including an acceleration command;

an electronic control unit including a microprocessor and a memory connected to the microprocessor;

a steering angle detection part configured to detect a steering angle in the left-right direction of the steering part;

a swing angle detection part configured to detect a swing angle in the left-right direction of the first member relative to the second member; and a vehicle speed detection part configured to detect a vehicle speed, wherein the microprocessor is configured to perform controlling the traveling actuator so as to generate a driving force in accordance with the travel command input by the input part, and the controlling including controlling the traveling actuator in accordance with the steering angle detected by the steering angle detection part, the swing angle detected by the swing angle detection part, and the vehicle speed detected by the vehicle speed detection part so as to generate a driving force smaller than the driving force in accordance with the acceleration command input by the input part, and the microprocessor is configured to further perform the controlling including calculating a first correction coefficient in a range larger than 0 and equal to or smaller than 1 in accordance with the steering angle and the swing angle, calculating a second correction coefficient in a range equal to or larger than 0 and equal to or smaller than 1 in accordance with the vehicle speed, and calculating a correction coefficient for the acceleration command based on the first correction coefficient and the second correction coefficient.

2. The vehicle according to claim 1, wherein the microprocessor is configured to perform the controlling including controlling the traveling actuator so that the driving force corresponding to the acceleration command when a steering direction of the steering part and a swing direction of the first member specified by detection values of the steering angle detection part and the swing angle detection part are not identical is smaller than the driving force corresponding to the acceleration command when the steering direction and the swing direction are identical.

3. The vehicle according to claim 2, wherein the microprocessor is configured to perform the controlling including increasing a decrease ratio of the driving force corresponding to the acceleration command, as the steering angle detected by the steering angle detection part increases.

4. The vehicle according to claim 1, wherein the microprocessor is configured to perform the controlling including increasing a decrease ratio of the driving force corresponding to the acceleration command, as the vehicle speed detected by the vehicle speed detection part decreases.

5. The vehicle according to claim 1, wherein the swing angle detection part is configured to detect a swing angle from a reference line extending in a gravity direction.

6. The vehicle according to claim 1, further comprising a biasing part configured to apply a turning force about the axial line to the first member so as to suppress a swing of the first member in the left-right direction, wherein the biasing part includes a damper, and the damper includes a shaft member, a block member fixed to the shaft member, a plurality of elastic members disposed so as to face a plurality of concave surfaces provided at the block member, and a case member disposed around the plurality of elastic members to restrict movements of the plurality of elastic members.

7. A vehicle, comprising:

a front wheel and a rear wheel;

a steering part disposed above the front wheel;

a placement part on which feet of an occupant are placed;

a first member configured to support the front wheel to be rotatable and steerable by the steering part;

a second member disposed behind the first member to support the rear wheel to be rotatable;

a connecting part configured to connect the first member with the second member so that the first member is swingable in a left-right direction about an axial line extending in a front-rear direction;

a traveling actuator configured to drive at least one of the front wheel and the rear wheel;

an input part configured to input a travel command including an acceleration command;

an electronic control unit including a microprocessor and a memory connected to the microprocessor;

a steering angle detection part configured to detect a steering angle in the left-right direction of the steering part;

a swing angle detection part configured to detect a swing angle in the left-right direction of the first member relative to the second member; and a biasing part configured to apply a turning force about the axial line to the first member so as to suppress a swing of the first member in the left-right direction, wherein the microprocessor is configured to perform controlling the traveling actuator so as to generate a driving force in accordance with the travel command input by the input part, and the controlling including controlling the traveling actuator in accordance with the steering angle detected by the steering angle detection part and the swing angle detected by the swing angle detection part so as to generate a driving force smaller than the driving force in accordance with the acceleration command input by the input part, the biasing part includes a damper, and the damper includes a shaft member, a block member fixed to the shaft member, a plurality of elastic members disposed so as to face a plurality of concave surfaces provided at the block member, and a case member disposed around the plurality of elastic members to restrict movements of the plurality of elastic members.

8. The vehicle according to claim 7, wherein the microprocessor is configured to perform the controlling including controlling the traveling actuator so that the driving force corresponding to the acceleration command when a steering direction of the steering part and a swing direction of the first member specified by detection values of the steering angle detection part and the swing angle detection part are not identical is smaller than the driving force corresponding to the acceleration command when the steering direction and the swing direction are identical.

9. The vehicle according to claim 7, wherein the microprocessor is configured to perform the controlling including increasing a decrease ratio of the driving force corresponding to the acceleration command, as the steering angle detected by the steering angle detection part increases.

10. The vehicle according to claim 7, further comprising a vehicle speed detection part configured to detect a vehicle speed, wherein the microprocessor is configured to perform the controlling including further controlling the traveling actuator in accordance with the vehicle speed detected by the vehicle speed detection part so as to generate the driving force smaller than the driving force in accordance with the acceleration command input by the input part.

11. The vehicle according to claim 10, wherein the microprocessor is configured to perform the controlling including increasing a decrease ratio of the driving force corresponding to the acceleration command, as the vehicle speed detected by the vehicle speed detection part decreases.

12. The vehicle according to claim 7, wherein the swing angle detection part is configured to detect a swing angle from a reference line extending in a gravity direction.

13. The vehicle according to claim 10, wherein the microprocessor is configured to perform the controlling including calculating a first correction coefficient in a range larger than 0 and equal to or smaller than 1 in accordance with the steering angle and the swing angle, calculating a second correction coefficient in a range equal to or larger than 0 and equal to or smaller than 1 in accordance with the vehicle speed, and calculating a correction coefficient for the acceleration command based on the first correction coefficient and the second correction coefficient.

* * * * *